(12) United States Patent
Monsees et al.

(10) Patent No.: US 11,150,855 B2
(45) Date of Patent: Oct. 19, 2021

(54) DISPLAY SUPPORT STRUCTURE

(71) Applicant: Production Resource Group, L.L.C., Armonk, NY (US)

(72) Inventors: Shane Monsees, Lancaster, CA (US); Jeremy Hochman, Walnut, CA (US); Patrick Campbell, Canyon Country, CA (US)

(73) Assignee: Production Resource Group, L.L.C., Armonk, NY (US)

( * ) Notice: Subject to any disclaimer, the term of this patent is extended or adjusted under 35 U.S.C. 154(b) by 0 days.

(21) Appl. No.: 15/176,614

(22) Filed: Jun. 8, 2016

(65) Prior Publication Data
US 2017/0357472 A1    Dec. 14, 2017

(51) Int. Cl.
*F16M 11/22* (2006.01)
*G06F 1/16* (2006.01)
*F16M 13/02* (2006.01)
*G06F 3/14* (2006.01)
*G09F 9/302* (2006.01)

(52) U.S. Cl.
CPC ........... *G06F 3/1446* (2013.01); *F16M 11/22* (2013.01); *F16M 13/02* (2013.01); *G06F 1/1601* (2013.01); *G09F 9/3026* (2013.01); *F16M 2200/02* (2013.01); *G09G 2300/026* (2013.01)

(58) Field of Classification Search
CPC .... G06F 3/1446; G06F 1/1647; G06F 1/1649; H05K 5/0017; H05K 5/0204; H05K 5/0234; H05K 5/0221; F16M 11/22; F16M 11/041; F16M 11/42; F16M 2200/08
See application file for complete search history.

(56) References Cited

U.S. PATENT DOCUMENTS 4,785,565 A * 11/1988 Kuffner ................... A47F 5/105
160/135
5,375,641 A * 12/1994 Schlueter ................. A47G 5/00
160/135

(Continued)

FOREIGN PATENT DOCUMENTS

WO   WO-2006098727 A1 *  9/2006  ............... G09F 9/33
WO      2008112152 A1     9/2008

OTHER PUBLICATIONS

Iterlocking LCD Video Wall, http://www.adapttechgroup.com/pdfs/lcd_video_wall.html (Last viewed Apr. 13, 2016).

(Continued)

*Primary Examiner* — James Wu
*Assistant Examiner* — Christopher L Augustin
(74) *Attorney, Agent, or Firm* — Downs Rachlin Martin PLLC

(57) ABSTRACT

Display panel frames configured and dimensioned to support display panels and also attach to adjacent display panel frames in a modular fashion to form a larger display assembly. In some examples, the display panel frames include one or more structural members configured to support a load on the frame, wherein the structural members also have at least one display panel mount for attaching a display panel to the frame. In some examples, the frames are configured to support display panels having mounting interface points conforming with a Video Electronics Standards Association (VESA) interface standard.

35 Claims, 7 Drawing Sheets

(56) References Cited

U.S. PATENT DOCUMENTS

| | | | |
|---|---|---|---|
| 5,537,766 A * | 7/1996 | Nickens | G09F 15/0068 160/135 |
| D466,617 S | 12/2002 | Leemans | |
| 6,802,575 B1 | 10/2004 | Lee | |
| 6,926,375 B2 | 8/2005 | Nagamine et al. | |
| 7,063,449 B2 | 6/2006 | Ward | |
| D586,338 S | 2/2009 | Stenhouse et al. | |
| D596,314 S | 7/2009 | Parsons | |
| 8,007,121 B2 | 8/2011 | Elliott et al. | |
| 8,079,311 B2 | 12/2011 | Whalen et al. | |
| 8,164,886 B1 | 4/2012 | Shelander et al. | |
| 8,172,097 B2 | 5/2012 | Nearman et al. | |
| D676,430 S | 2/2013 | Blaser | |
| 8,451,594 B2 * | 5/2013 | Kim | G09F 9/3026 361/679.04 |
| D702,670 S | 4/2014 | Davis | |
| 8,717,751 B2 | 5/2014 | Marker | |
| 8,727,293 B2 | 5/2014 | Tait et al. | |
| 8,833,713 B2 * | 9/2014 | Kitaguchi | F16M 11/048 248/220.21 |
| 8,910,804 B2 | 12/2014 | Kim et al. | |
| D725,638 S | 3/2015 | Hofman et al. | |
| D732,696 S | 6/2015 | Lund et al. | |
| D736,750 S | 8/2015 | Hochman et al. | |
| D737,271 S | 8/2015 | Morrissey | |
| 9,179,775 B2 | 11/2015 | Chen | |
| 9,326,620 B1 * | 5/2016 | Cross | A47F 3/001 |
| 2004/0233125 A1 | 11/2004 | Tanghe et al. | |
| 2005/0201087 A1 | 9/2005 | Ward | |
| 2007/0000849 A1 * | 1/2007 | Lutz | G09F 9/33 211/26 |
| 2007/0052872 A1 * | 3/2007 | Vermeulen | A47B 81/065 348/787 |
| 2007/0176854 A1 | 8/2007 | Ward et al. | |
| 2007/0218751 A1 | 9/2007 | Ward | |
| 2009/0178321 A1 * | 7/2009 | Kucharski | A47G 1/08 40/700 |
| 2009/0225506 A1 * | 9/2009 | Lee | H05K 5/0017 361/679.21 |
| 2010/0045888 A1 | 2/2010 | Naritomi | |
| 2010/0224751 A1 * | 9/2010 | Hochhalter | A47B 81/06 248/314 |
| 2010/0243843 A1 | 9/2010 | Tait et al. | |
| 2011/0127397 A1 * | 6/2011 | Sonntag | F16M 11/10 248/276.1 |
| 2011/0163052 A1 | 7/2011 | Kim et al. | |
| 2012/0050137 A1 * | 3/2012 | Hellenthal | F16M 13/02 345/1.3 |
| 2012/0120033 A1 | 5/2012 | Mittan et al. | |
| 2012/0169947 A1 | 7/2012 | Anderson | |
| 2013/0168335 A1 * | 7/2013 | Gillespie | F16M 11/041 211/26 |
| 2013/0193092 A1 * | 8/2013 | Stifal | F16M 11/045 211/26 |
| 2014/0078685 A1 * | 3/2014 | Lee | H05K 5/0017 361/730 |
| 2014/0263890 A1 | 9/2014 | McCarthy et al. | |
| 2014/0376757 A1 | 12/2014 | Engle | |
| 2015/0069194 A1 | 3/2015 | Stifal et al. | |
| 2015/0187237 A1 * | 7/2015 | Hall | G09F 9/3023 362/249.01 |

OTHER PUBLICATIONS

Tote Vision Full-Service Video Wall Mount For 40 to 60" Displays, http://www.bhphotovideo.com/c/product/1087143-REG/tote_vision_tvds_vw765_land_full_service_video_wall_mount.html/prm/alsVwDtl (Last viewed Apr. 13, 2016).

Peerless-AV Ultra Thin Flat Video Wall Mount For 40-50" Displays, http://www.bhphotovideo.com/c/product/824569-REG/Peerless_Industries_DS_VW650_Ultra_Thin_Flat_Video.html/prm/alsVwDtl (Last viewed Apr. 13, 2016).

Indiamart. Video Wall Frames Panels, http://www.indiamart.com/proddetail/video-wall-frames-panels-4468296230.html (Last viewed Apr. 13, 2016).

TEQZO Environments. Video Walls Bezel Less. http://environments.teqzo.com/portfolio/bezel-less-video-wall/ (Last Viewed Apr. 13, 2016).

DAH Display. Manufacturer Directly Supply Compositional Aluminum-Glass Frame Video Display Rack/Display Racks. http://daho.en.alibaba.com/product/60284357683-209421127/Manufacturer_directluly_supply_compositional_aluminum_glass_frame_video_display_rack_display_racks.html (Last Viewed Apr. 13, 2016).

Platforms, http://www.ia470.com/primer/platform.htm (Last viewed Apr. 13, 2016).

Pioneer Drama Service, Newsletter: Creative Theatrical Ideas, "How to Build a Simple and Sturdy Stage Platform," by Brian D. Taylor. Mar. 20, 2013 https://www.pioneerdrama.com/Newsletter/Articles/Stage_Platform.asp.

DIY Velvet Diamond-Tufted Headboard, http://www.glitterandgoatcheese.com/tag/bed/ (Last viewed Apr. 13, 2016).

Slide and Fold.co.uk UPVC Window. http://www.slideandfold.co.uk/diy-white-side-hung-next-to-fixed-next-to-side-hung-upvc-window-liniar-style-36.html (Last viewed Apr. 13, 2016).

Wikipedia, Wall Stud. https://en.wikipedia.org/wiki/Wall_stud (Last viewed Apr. 13, 2016).

FLyin' Miata, Flyin' Miata NA/NB Frame Rail Reinforcement Kit. https://www.flyinmiata.com/fm-frame-rail-reinforcement-kit.html (Last viewed Apr. 13, 2016).

Schwenke.com—Mounted Mirror. Https://www.pinterest.com/pin/469007748664377003/ (Last viewed Apr. 13, 2016).

Houzz, 48" Rectangle Butchers Rack with 18 Hooks, http://www.houzz.com/photos/3210841/48-Rectangular-Butchers-Rack-with-18-Hooks-Satin-Black-modern-pot-racks-and-accessories-other-metro (Last viewed Apr. 13, 2016).

* cited by examiner

DISPLAY SUPPORT STRUCTURE

FIELD OF THE INVENTION

The present invention generally relates to the field of support structures. In particular, the present invention is directed to display support structures.

BACKGROUND

Electronic displays are often arranged in a modular fashion to form larger display assemblies. Display support structures can be used to structurally support the displays in an ordered arrangement to form the display assembly. The design and construction of the display support structure can be influenced by a variety of factors, including the type of electronic display, the size of the display assembly, ease of assembly and disassembly, as well as other factors.

SUMMARY OF THE DISCLOSURE

In one implementation, the present disclosure is directed to a frame for supporting a display panel. The frame includes an outer portion including: first and second cross members each having first and second ends; a first vertical member extending between the first ends of the first and second cross members; and a second vertical member extending between the second ends of the first and second cross members; and at least one internal vertical member extending between the first and second cross members, the at least one internal vertical member having at least one display mount for attaching a display panel thereto, wherein the at least one internal vertical member is designed and configured to be a structural support member that, when the frame is in use, supports at least a portion of a vertical load applied to the frame.

In another implementation, the present disclosure is directed to a display assembly. The display assembly includes a plurality of display panels; a plurality of frame modules removeably connected together to form a display assembly support structure, each of the display panels being coupled to a corresponding respective one of the frame modules; wherein each of the frame modules includes: an outer portion having first and second cross members; and a plurality of internal vertical members extending between the first and second cross members, at least some of the plurality of internal vertical members having at least one display mount for mounting a display panel thereto, wherein the plurality of internal vertical members are designed and configured to be structural support members and support a portion of a vertical load from display panels and frames located above the frame module.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Aspects of the present disclosure include display panel frames configured and dimensioned to support display panels and also attach to adjacent display panel frames in a modular fashion to form a larger display assembly. In some examples, the display panel frames include one or more structural members configured to support a load on the frame, wherein the structural members also have at least one display panel mount for attaching a display panel to the frame. In some examples, the frames are configured to support display panels having mounting interface points on an internal portion of a rear face of the display, such as mounting interface points configured to substantially conform with a Video Electronics Standards Association (VESA) interface standard. In some examples, the frames disclosed herein are configured to form a relatively thin and lightweight display assembly support structure capable of supporting a large array of displays that can be easily assembled and disassembled.

Figure 1:
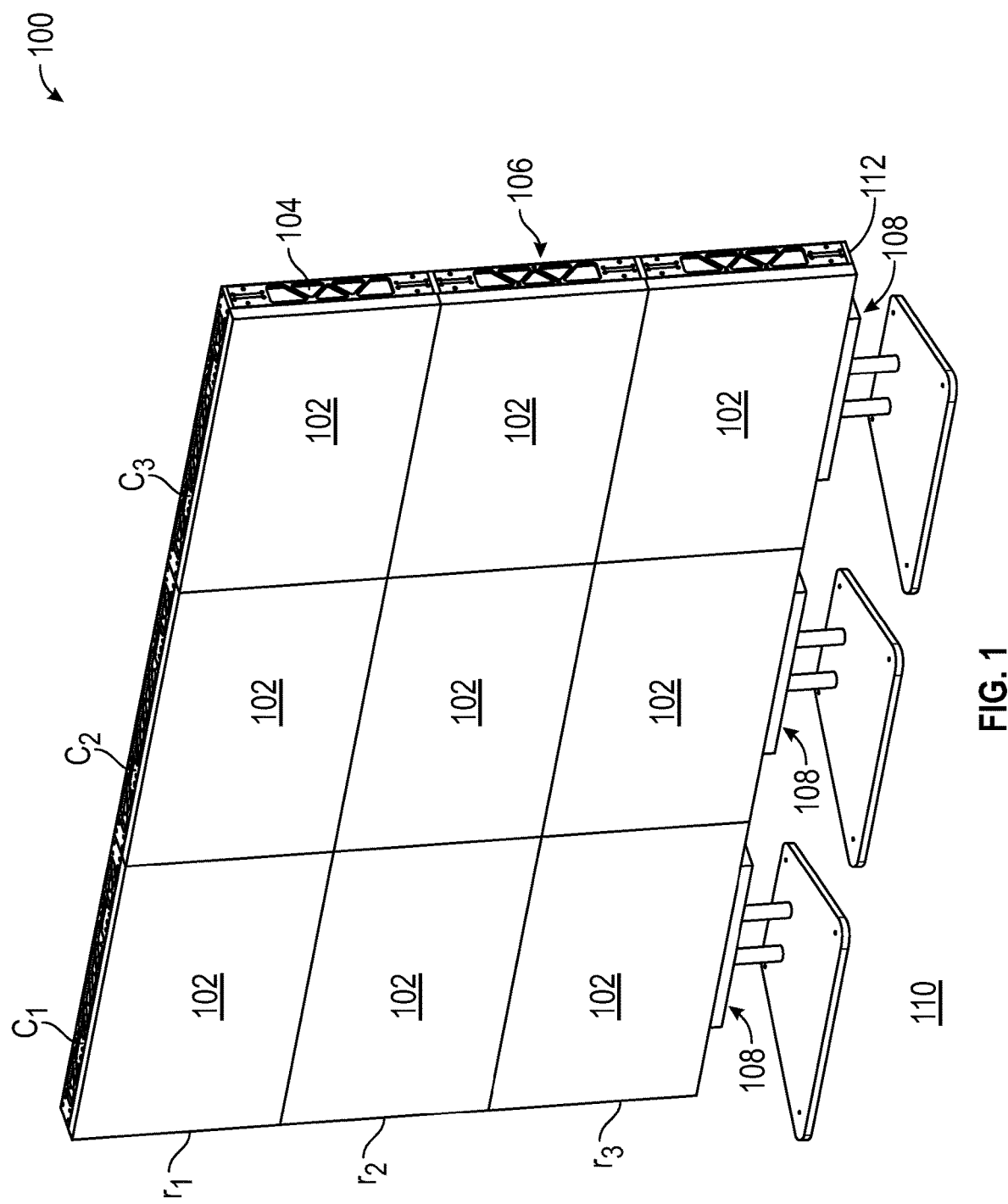
FIG. 1 is a front isometric view of a display assembly including a plurality of displays supported by a display assembly support structure.
Figure 2:
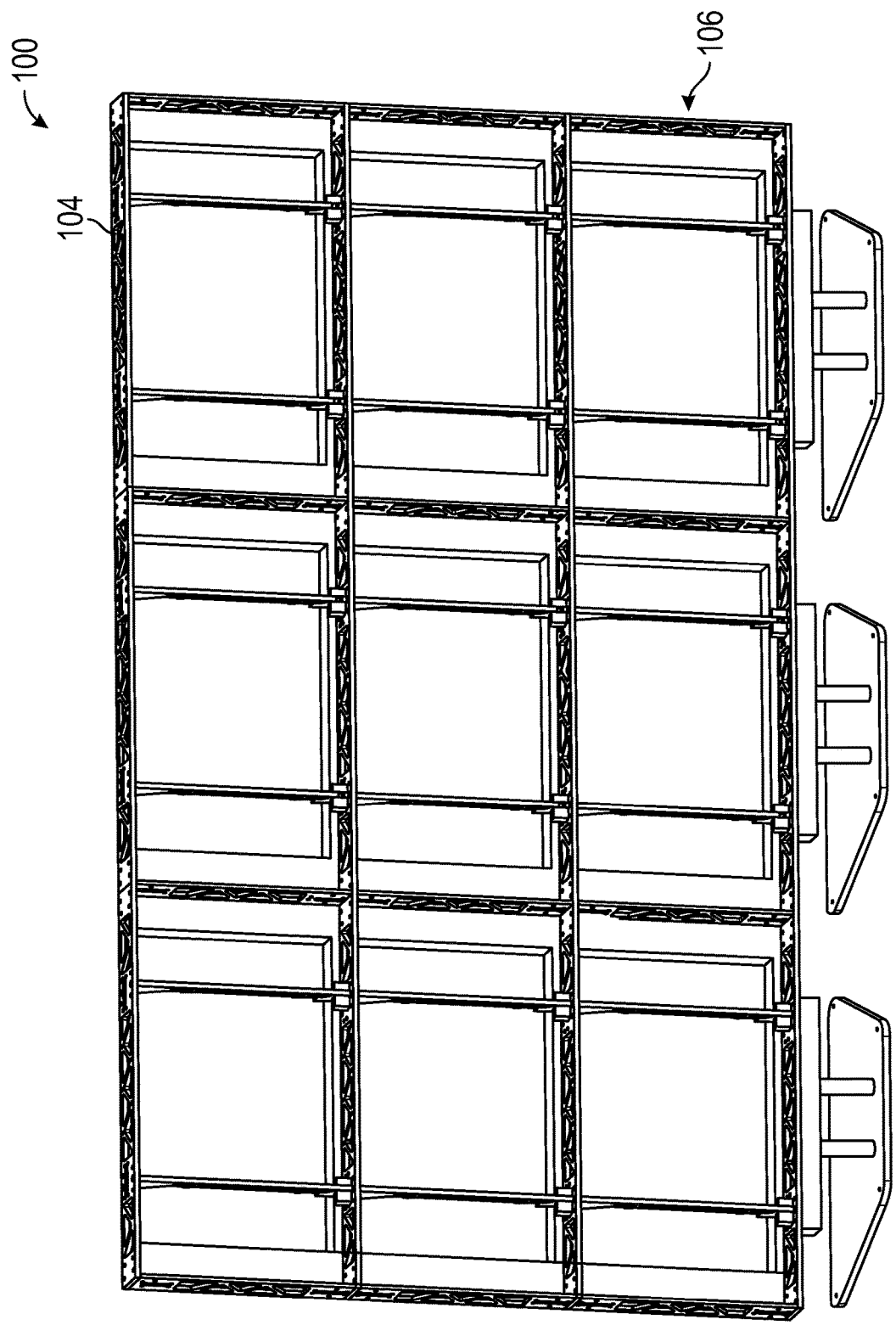
FIG. 2 is a rear isometric view of the display assembly of FIG. 1.

FIGS. 1 and 2 show an exemplary display assembly 100 including a plurality of display panels 102. Display panels 102 can have any of a variety of different constructions known in the art, including having light-emitting elements (e.g., backlit, side-lit, emissive, etc.) and non-light-emitting elements (e.g., reflective). Examples of light-emitting elements include liquid-crystal display (LCD) devices, electronic-paper display devices, plasma display devices, light-emitting-diode (LED) display devices, organic light emitting diode (OLED, incandescent display devices, and rear-projection display devices, such as display devices based on digital light processors, fluorescent bulbs, polymer light emitting diodes, electroluminescent lights, other suitable light emitting sources, and/or a combination of light emitting elements, among others. Examples of non-light emitting elements include reflective displays, such as cholesteric LCD, electrophoretic displays, electrochromic displays, electrowetting, light refraction, interference, and/or diffraction displays, among others. Display panels 102 can be electrically connected in any manner known in the art for providing any type of visual effect, including displaying separately, or in conjunction with other ones of the display panels to form larger-format images or visual effects.

Each of display panels 102 is coupled to a corresponding respective frame module 104, also referred to herein as a "frame" 104, (only one of the nine present is labeled in FIGS. 1 and 2). Each frame module 104 is configured to support a corresponding respective display panel 102 and also attach to adjacent frame modules 104, to thereby form a display assembly support structure 106 for positioning and supporting the display panels 102 in an ordered array of rows r1-r3 and columns c1-c3. As will be appreciated, the modular nature of frame modules 104 enables the frame modules to be arranged into a variety of different numbers of rows and columns to form a variety of differently-sized display assemblies. The 3×3 array of display panels 102 is, therefore, shown by way of example, and other numbers of rows and columns of display panels 102 and frames 104 may be formed. In the illustrated example, display assembly support structure 106 is free-standing and includes base assemblies 108 for supporting the assembly on a ground surface 110. In the illustrated example, each column of displays 102 is supported by a corresponding respective base assembly 108, with the bottom row r1 of frame modules 104 being coupled to a corresponding respective base assembly 108. In other examples, instead of one or more base assemblies 108, display assembly 100 may be attached to any of a variety of other support structures or directly attached to a wall.

Figure 3:
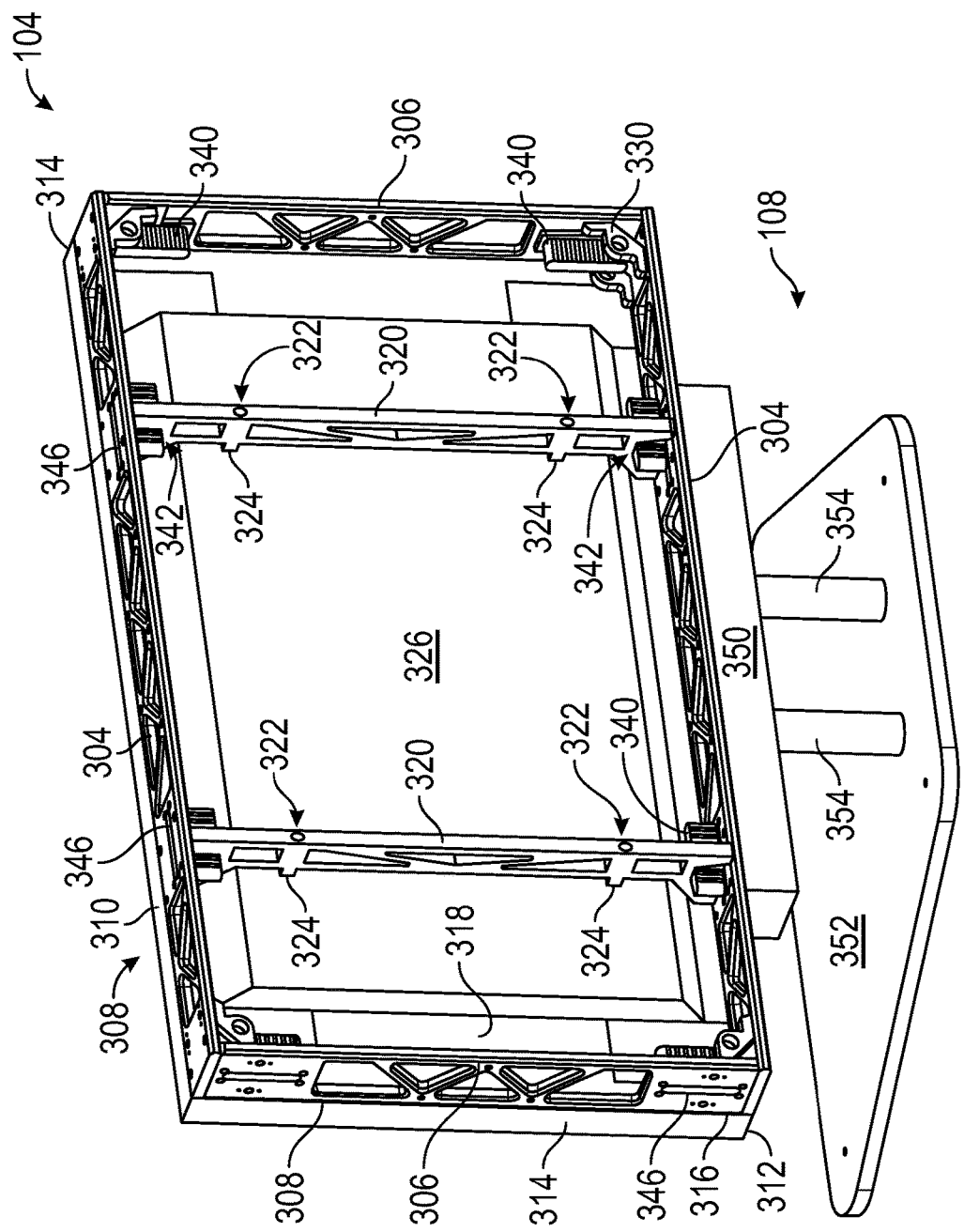
FIG. 3 is a rear isometric view of one of the frame modules and a base assembly of the display assembly support structure of FIGS. 1 and 2 supporting one of the displays of FIGS. 1 and 2.

FIG. 3 shows one of display panels 102 supported by one of frames 104 and one of base assemblies 108. FIGS. 4-8 provide additional views of frame 104. As shown in FIGS. 3-8, exemplary frame 104 includes first and second cross members 304 and first and second vertical members 306 arranged to form an outer portion 308 of the frame, with first and second vertical members 306 extending between the ends of cross members 304. As shown in FIG. 3, display panel 102 has a perimeter surface defined by top and bottom sides 310, 312, respectively, and opposing sides 314 extending between the top and bottom sides. Outer portion 308 of exemplary frame 104 is configured and dimensioned to have substantially the same outer-most dimensions as the perimeter surface of display 102. When frame 104 is coupled to adjacent frames 104, outer portions 308 of frames 104 align the perimeter surfaces of their corresponding respective displays 102 to form a display assembly 106 (FIG. 1) that is substantially seamless, e.g., with little to no spacing between the top 310, bottom 312, and opposing sides 314 of adjacent panels 102. In the illustrated example, first and second cross members 304 have a length that is substantially the same as top and bottom sides 310, 312, and first and second vertical members 306 have a length that, when coupled to the first and second cross members, result in the spacing between the outer surfaces of the cross members being substantially the same as the spacing between top and bottom sides 310, 312 of display 102. In the illustrated example, a front face 316 of outer portion 308 is configured to abut or be in close proximity to a rear face 318 of display 102 when display 102 is coupled to frame 104. In other examples, frames made in the accordance with the present disclosure may have an outer portion having outermost dimensions that are less than the outermost dimensions of the display panels the frames are configured to support.

Exemplary frame also includes first and second internal vertical members 320 that are configured as structural members and also configured to couple display 102 to frame 104. Exemplary internal vertical members 320 extend between first and second cross members 304 and are substantially perpendicular thereto and are disposed between first and second vertical members 306 and are substantially parallel thereto. Internal vertical members 320 may each include display mounts 322 that are configured and dimensioned to align with and couple to a plurality of mounting interface points 324 located on an inner portion 326 of rear face 318 of display panel 102. In other embodiments, frames made in accordance with the present disclosure may have more or less than two internal vertical members. For example, an exemplary frame may have a single internal vertical member, e.g., centrally located in the frame, and display mounts may be coupled to the single internal vertical member. For example, a mounting plate with a plurality of display mounts may be coupled to a single internal vertical member. In other examples, frames may include three or more internal vertical members, where one or more of the internal vertical members have one or more display mounts.

In the illustrated example, mounting interface points 324 may be sized and configured to substantially conform with a Video Electronics Standards Association (VESA) interface standard. Frame 104 may be configured so that display mounts 322 are configured and dimensioned to align with and couple to one or more types of displays having mounting interface points 324 that conform to one or more VESA standards. In other examples, frames made in accordance with the present disclosure may be configured to support displays having other types of mounting interface points, including ones that do not conform to a VESA interface standard. In the illustrated example, display 102 is a standard commercially available display that is configured to be mounted to a support structure, such as frame 104, or any other structure, via mounting interface points 324 and does not have any mounting interface points (or other features for coupling the display to a support structure) proximate the perimeter surface of the display. For example, it is common for LCD displays to have mounting interface points similar to display 102, while it is common for LED display panels to have mounting interface points (or other features for coupling the display to a support structure) proximate the perimeter surface of the display. Exemplary frame 104 is, therefore, configured to be coupled to a plurality of other frames 104 to form support structure 106 (FIG. 1) for supporting a plurality of displays 102 having mounting interface points 324 that confirm to a VESA interface standard.

Figure 4:
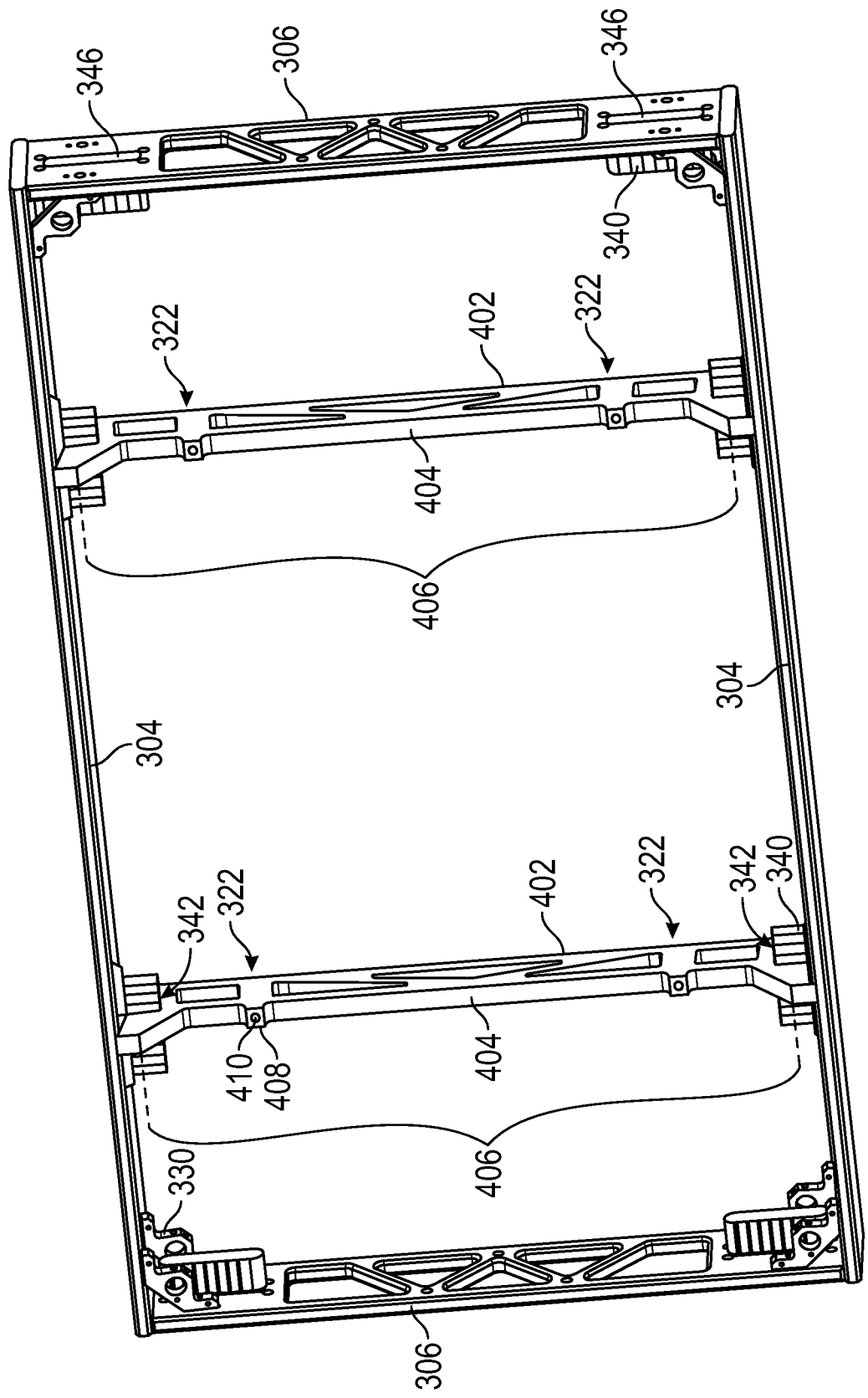
FIG. 4 is a front isometric view of the frame module of FIG. 3.
Figure 5:
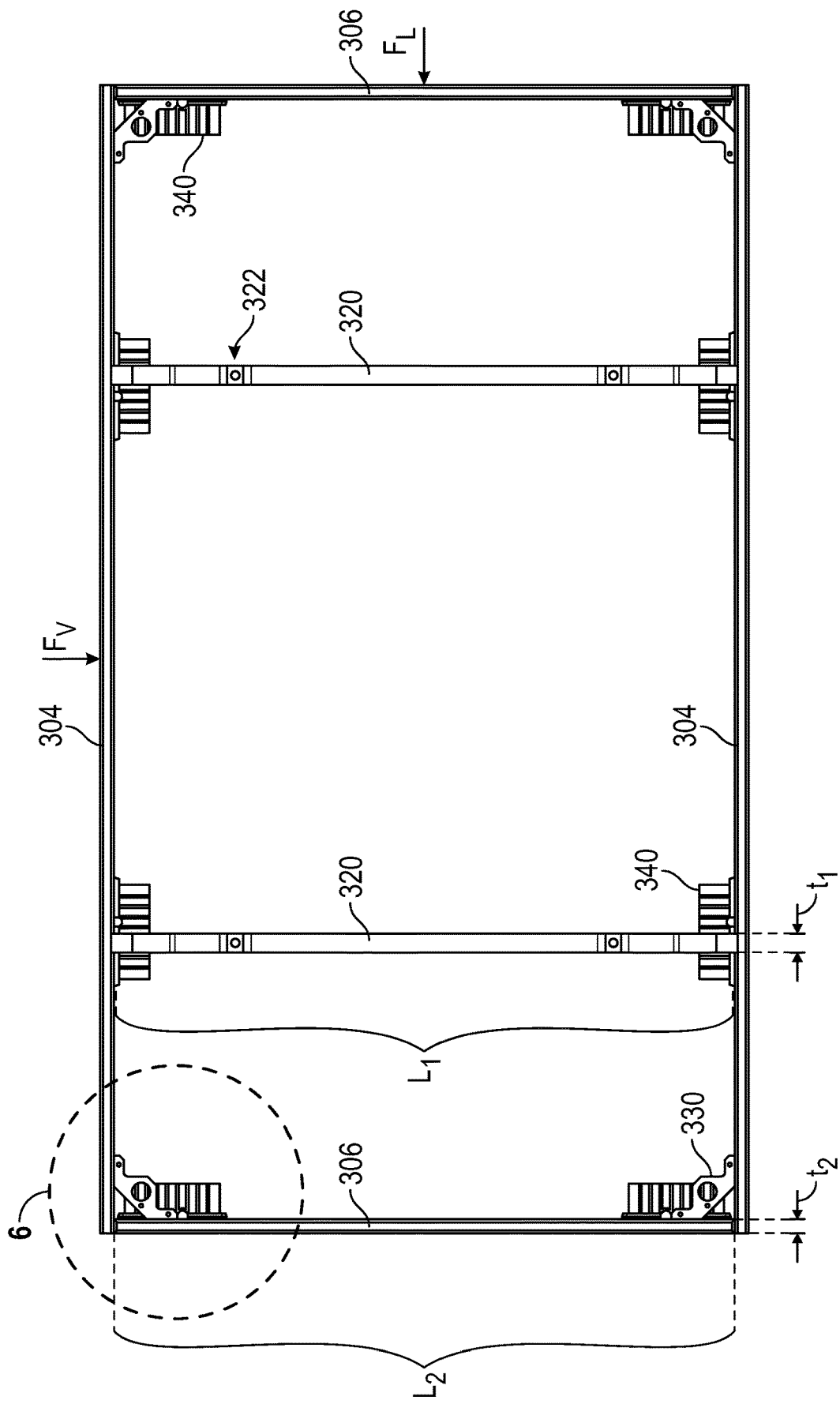
FIG. 5 is a front view of the frame module of FIGS. 3 and 4.

Referring to FIG. 4, internal vertical members 320 each have a back side 402 and an opposing front side 404, the front side including a recess 406 sized and configured to accommodate a rearwardly-projecting portion of a rear face 318 of display panel 102 (FIG. 3). As shown in FIG. 4, exemplary display mounts 322 each include a protrusion 408 (only one labeled) on front side 404 of internal vertical member 320 that stands proud of adjacent portions of the front side. Protrusions 408 may be configured to come into contact with inner portion 326 of display 102 (FIG. 3). Each protrusion 408 includes an opening 410 that extends from front side 404 to back side 402 and that is sized and configured to accept a coupling member, such as a bolt assembly, for coupling display 102 to display mount 322. As will be appreciated, in other examples, any number of alternative configurations may be used for display mounts 322 for coupling internal vertical members 320 to mounting interface points 324 (FIG. 3).

Figure 6:
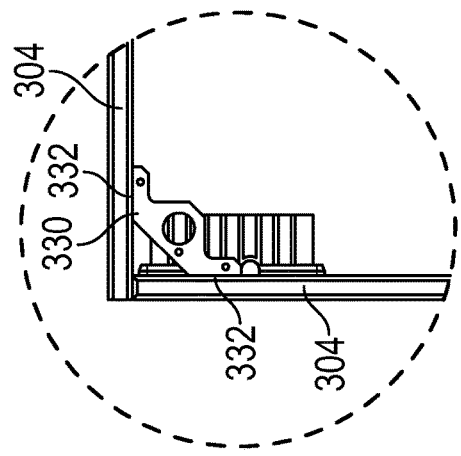
FIG. 6 is an enlarged view of region 6 of FIG. 5, illustrating detail of a corner of the frame module of FIGS. 3-5.
Figure 7:
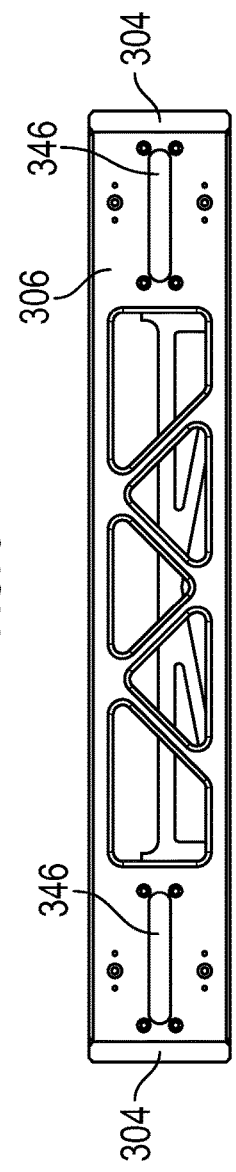
FIG. 7 is a side view of the frame module of FIGS. 3-6.
Figure 8:
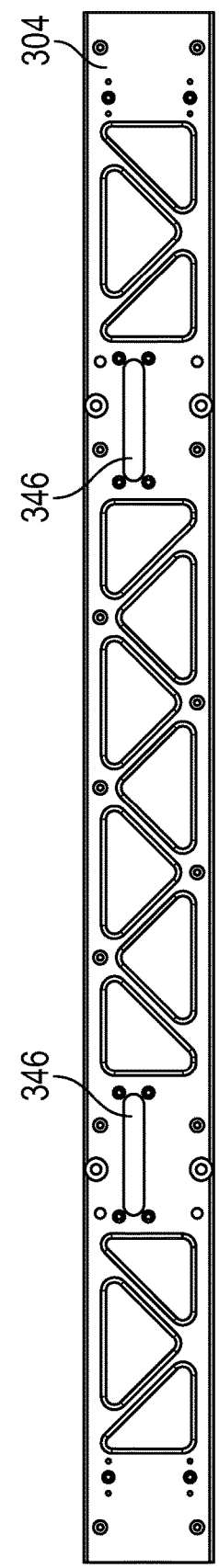
FIG. 8 is a top view of the frame module of FIGS. 3-7.

Referring to FIGS. 3-6, first and second cross members 304 and first and second vertical members 306 are removeably connected together with a plurality of connection members 330 (only some labeled). In the illustrated example, frame 104 includes eight connection members 330, with two disposed in each corner of outer portion 308 of frame 104. As best seen in FIG. 6, each connection member 330 has a unitary construction and has connection surfaces 332 for connecting to adjacent cross and vertical members 304, 306 and positioning the adjacent cross and vertical members at approximately 90 degrees in relation to each other. In the illustrated example, connection members 330 include holes (not illustrated) that extend through connection surfaces 332 for receiving a coupling member, such as a bolt assembly for bolting the connection member to the cross and vertical members 304, 306. Such an arrangement allows for rapid assembly and disassembly of frame 104 and display assembly support structure 106. In addition, the modular nature of display assembly support structure 106, including utilizing the same connection members 330 in each corner of each frame 104 further enables rapid assembly and ease of replacement of parts. In other examples, frames 104 may be permanently assembled, for example, by welding.

Figure 10:
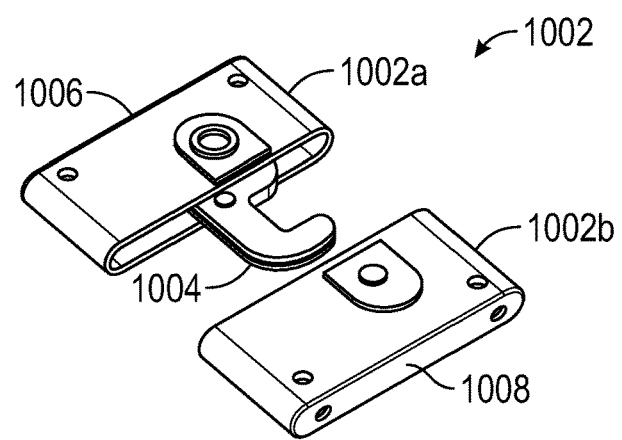
FIG. 10 is a front isometric view of first and second complementary couplers that form a coupler mechanism.

Referring to FIGS. 3-6, frame 104 may also include a plurality of coupler housings 340 (only some labeled) for housing a coupler, such as, for example, one or the other of complementary couplers 1002a and 1002b of coupler mechanism 1002 of FIG. 10, for coupling frame 104 to adjacent frames, or for attaching the frame to base assembly 108 (FIGS. 1 and 3). In the illustrated example, both vertical members 306 include two coupler housings 340 and associated couplers, one located at each end of the vertical member. Each cross member 304 similarly includes two coupler housings 340 and associated couplers, with the coupler housings disposed in coupler recesses 342 located in opposed first and second ends of internal vertical members 320, such that the coupler housings and couplers are located proximate the opposed first and second ends of the internal vertical members. In the illustrated example, these couplers are used to couple cross members 304 to adjacent cross members of another one of frames 104 to form a larger assembly, such as display assembly support structure 106 (FIGS. 1 and 2). As shown in FIG. 3, the location on frame 104 where couplers 1002a,b couple cross members 304 to adjacent cross members of another frame is substantially the same as the location where internal vertical members 320 couple to the cross members. In other examples, the location of coupler housings 340 and couplers 1002a,b may be varied, for example, they may be located closer or farther away from the ends of the vertical and cross members 306, 304. Each of cross members and vertical members 304, 306 also include coupler openings 346 that extend through the thickness of each of the cross and vertical members and allow a portion of the couplers to extend through the cross or vertical members to couple with the cross and vertical members of adjacent frames or to couple with one of base assemblies 108.

As noted above, FIG. 10 shows an exemplary coupler mechanism 1002, including first coupler 1002a and complementary second coupler 1002b. First coupler 1002a includes a latch 1004 rotatably disposed in a housing 1006. Latch 1004 is configured to move between a unlocked position, wherein the latch is disposed in housing 1006, and a locked position, wherein the latch is extending from the housing. Second coupler 1002b includes a complementary feature (not illustrated) disposed in housing 1008 for coupling with latch 1004, such as a catch rod disposed in housing 1008. One of first and second couplers 1002a,b may be disposed in one of coupler housings 340 (FIG. 3), e.g., the coupler housings located on a first end of internal vertical members 320, and the other one of the first and second couplers may be disposed in the coupler housings at a second, opposite end of the internal vertical members, such that the couplers in frame 104 and in an adjacent frame complement one another to form overall coupler mechanism 1002. In other examples, a variety of alternative coupler mechanisms may be used. In the illustrated example, when frame 104 is coupled to an adjacent frame, the outer surface of the cross and vertical members abut and are in direct contact with the outer surface of an adjacent frame, with the couplers extending through the aligned coupler openings 346 to thereby couple the adjacent frames together.

As shown in FIGS. 1-3, coupler housings 304 and the couplers disposed therein may also be configured and dimensioned for coupling with base assembly 108, such that frame 104 can be interchangeably used as a lower-most frame in display assembly 100, or be used in a row other than first row r1 of the display assembly. Base assembly 108 may include an attachment portion 350 configured to couple to frame 104, a base 352, and one or more supports 354 for supporting the attachment portion on the base. Exemplary base assembly 108 is configured and dimensioned to support one or more frames 104 on ground surface 110 to provide a free-standing display assembly 100. In other examples, a single base assembly may be used that is configured to support two or more columns of frames 104.

In the example shown, during use, internal vertical members 320 will support a substantial portion of a vertical load $F_v$ (FIG. 5) on frame 104, such as vertical loads from one or more frames 104 and display panels 102 located above the frame. Thus, exemplary internal vertical members 320 are configured as structural support members. In one example, internal vertical members 320 are configured to support substantially all of vertical load $F_v$ on frame 104. In the example shown, internal vertical members 320 provide an internal vertical load path, where the weight of each display 102 is directly supported by the internal vertical members. Internal vertical members 320 transmit the load of a display panel 102 coupled thereto as well as the load from other frame modules 104 and display panels 102 located above the internal vertical load members 320, to a support structure, such as base assembly 108. In the illustrated example, outer portion 308 of frame 104 provides minimal structural support for vertical loading and is designed primarily for attaching frame 104 to adjacent frames and locating displays 102 properly in relation to adjacent displays. By providing an internal vertical load path, base assembly 108 can be more compact, with attachment portion 350 having approximately the same width as a spacing between internal vertical members 320. By contrast, if a majority of the vertical load was carried by first and second vertical members 306, first and second cross members 304 would need to be re-designed for the narrow width of base assembly 108, or a wider base assembly may be required.

In the illustrated example, internal vertical members 320 have a thickness t1 that is greater than a thickness t2 of vertical members 306. In one example, t1 may be approximately 50% greater than t2. In some examples, t1 may be approximately ¾" and t2 may be approximately ½." In one example, both the internal vertical members 320, vertical members 306, and cross members 304 may be formed from an aluminum alloy, such as 6061-T6. In other examples, any of a variety of other dimensions and materials may be used. For example, structural analyses, such as analyses performed with finite element analysis computer programs, may be executed to determine appropriate dimensions for internal vertical members 320, vertical members 306, and cross members 304 for a given application, e.g., size and weight of display panel 102, maximum size of display assembly 100, material type for the members, etc.

In the illustrated example, frame 104 is configured so that, during use, a substantial portion of any lateral load $F_L$ imposed on the frame will be supported by display panel 102 coupled to the frame, rather than by the frame itself. For example, lateral loads $F_L$ imposed on frame 104 may be transmitted through outer portion 308 of the frame to internal vertical members 320, and the internal vertical members may transmit the lateral load $F_L$ to display panel 102 via display mounts 322. Structure within display panel 102 may act as structural support members for supporting a portion of lateral load $F_L$. In one example, frame 104 may be configured to support less than approximately 80% of lateral loads $F_L$; in other examples, less than approximately 50% of lateral loads $F_L$; in yet other examples, less than approximately 30% of lateral loads $F_L$. Lateral load $F_L$ may be transmitted from one frame 104 to an adjacent frame 104 via first or second vertical member 306 being in direct contact with the first or second vertical member of an adjacent frame, and/or opposing sides 314 of display panel 102 being in direct contact with the opposing sides of an adjacent display panel.

Figure 9:
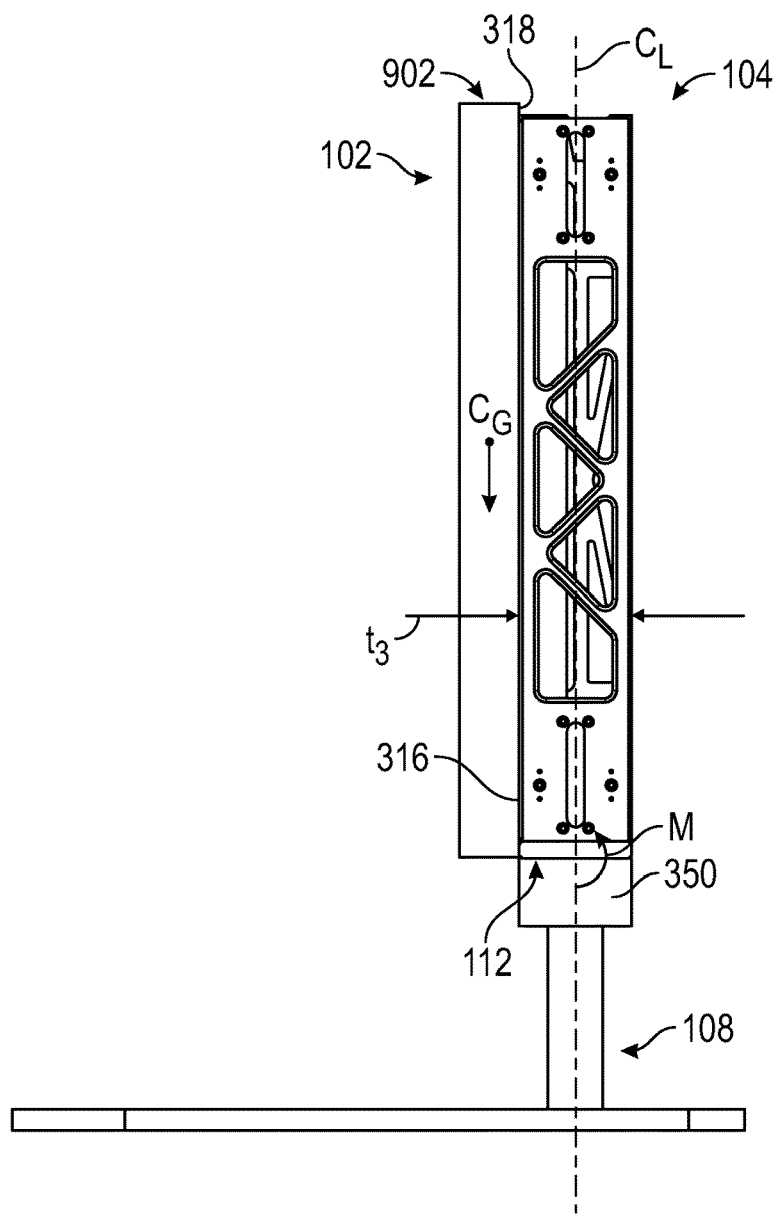
FIG. 9 is a side view of the frame module, base assembly, and display of FIG. 3.

Referring to FIG. 9, as discussed above, exemplary frame 104 is configured to be disposed on rear face 318 of display panel 102, with front face 316 of the frame abutting or in close proximity to the rear face of the display panel. With frame 104 so positioned, a front portion 902 of display 102 may be positioned in front of frame 104 so that the display panel is cantilevered from the frame. In one example, front portion 902 is a substantial portion of a total depth of display panel 102 in a forward-aft direction, for example, approximately 50% of the total depth. In some examples, a front face 904 of display panel 102 stands proud of frame 104, e.g., the front face may be spaced approximately 2 inches to approximately 6 inches from front face 316 of the frame. As shown in FIG. 9, display panel 102 may have a center of gravity $C_G$ that is located forward of a centerline $C_L$ of frame 104. In some examples, $C_G$ may be located forward of front face 316 of frame 104. In the illustrated example, frame 104 has a thickness t3 as measured in a forward-aft direction that is selected so that center of gravity $C_G$ of display panel 102 is outboard of the frame, as measured in the forward-aft direction. With the center of gravity $C_G$ of each display panel 102 in display assembly 100 (FIG. 1) so located, the combined weight of the display panels are cantilevered from display assembly support structure 106. The cantilevered display panels 102 may create a moment M (FIG. 9) at a bottom surface 112 (FIGS. 1 and 9) of the one or more frames 104. In one example, internal vertical members 320 may be configured to support all or a substantial portion of the moment M and transmit the moment M to base assembly 108.

The foregoing has been a detailed description of illustrative embodiments of the invention. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A display panel support frame comprising:
   an outer portion including:
      upper and lower cross members each having first and second ends;
      a first vertical member extending between the first ends of the upper and lower cross members; and
      a second vertical member extending between the second ends of the upper and lower cross members; and
   at least one internal vertical member extending between the upper and lower cross members, the at least one internal vertical member having at least one display mount for attaching a display panel thereto;
   wherein the display panel support frame is designed and configured to couple to adjacent display panel support frames to form a display assembly support structure for supporting a plurality of the display panels, the at least one internal vertical member being designed and configured to be a structural support member that, when the display panel support frame is in use, structurally supports the upper cross member, provides a load path for transmitting a force from the upper cross member to the lower cross member, and supports a substantial portion of a vertical load applied to the upper cross member from one or more frames located above the display panel support frame when assembled as the display assembly support structure;
   wherein the display panel support frame includes a plurality of the at least one internal vertical member, the plurality of internal vertical members designed and configured to support a greater proportion of the vertical load applied to the upper cross member from the one or more frames located above the display panel support frame when assembled as the display assembly support structure than the first and second vertical members.

2. The display panel support frame according to claim 1, wherein each of the plurality of the at least one internal vertical member has a first length and the first and second vertical members each have a second length that is less than the first length.

3. The display panel support frame according to claim 2, wherein the first and second vertical members have ends, further wherein the ends of the first and second vertical members are spaced from at least one of the upper and lower cross members.

4. The display panel support frame according to claim 1, wherein the plurality of the at least one internal vertical member are designed and configured to support more than 50% of the vertical load applied to the upper cross member from the one or more frames located above the display panel support frame when assembled as the display assembly support structure.

5. The display panel support frame according to claim 1, wherein the display panel support frame is configured for a substantial portion of a lateral load on the display panel support frame to be carried by the display panel when it is coupled to the display panel support frame.

6. The display panel support frame according to claim 1, wherein the display mounts are configured and dimensioned to couple to a plurality of mounting interface points located on an inner portion of a rear surface of the display panel to be supported by the display panel support frame.

7. The display panel support frame according to claim 6, wherein the display mounts are sized, configured, and located to substantially conform with a Video Electronics Standards Association (VESA) interface standard.

8. The display panel support frame according to claim 7, wherein the VESA interface standard requires four mounting interface points located on an inner portion of a rear surface of the display panel, and further wherein the display mounts are sized, configured, and located to be coupled to respective ones of the four mounting interface points.

9. The display panel support frame according to claim 1, wherein the display panel the display panel support frame is configured to support does not have any mounting interface points proximate a perimeter surface of the display panel.

10. The display panel support frame according to claim 1, wherein each of the plurality of the at least one internal vertical member includes a back side and an opposing front side, the front side including a recess sized and configured to accommodate a rearwardly-projecting portion of a rear surface of the display panel.

11. The display panel support frame according to claim 1, wherein the display panel support frame has a front face and a back face, further wherein the display panel support frame is configured so that the front face confronts a rear face of the display panel when the display panel is coupled to the display panel support frame.

12. The display panel support frame according to claim 1, wherein the display panel support frame has a centerline in a forward-aft direction, further wherein the display panel support frame is configured and dimensioned so that a center of gravity of the display panel mounted thereto is forward of the centerline.

13. The display panel support frame according to claim 1, wherein the display panel support frame has a front face, further wherein the display panel support frame is configured and dimensioned so that a center of gravity of the display panel mounted thereto is forward of the front face.

14. The display panel support frame according to claim 1, wherein the display panel support frame has a front face, the display panel support frame being configured to be disposed on a rear face of the display panel so that a front portion of the display panel is positioned in front of the front face of the display panel support frame so that the display panel is cantilevered from the display panel support frame.

15. The display panel support frame according to claim 1, wherein the display panel support frame includes a plurality of couplers for attaching together adjacent frames to form the display assembly support structure.

16. The display panel support frame according to claim 15, wherein the outer portion is configured and dimensioned to align a perimeter surface of the display panel when it is coupled to the display panel support frame in close proximity with a perimeter surface of an adjacent display panel supported by an adjacent display panel support frame frame to provide a substantially seamless display assembly.

17. The display panel support frame according to claim 15, wherein the display assembly support structure is configured to be free-standing.

18. The display panel support frame according to claim 15, wherein at least one of the plurality of the at least one internal vertical member has first and second ends, one of the couplers being located proximate each of the first and second ends of the at least one internal vertical member.

19. The display panel support frame according to claim 18, wherein the at least one of the plurality of at least one internal vertical member includes coupler recesses in each of the first and second ends, one of the couplers being disposed in each of the coupler recesses.

20. The display panel support frame according to claim 1, wherein at least one of the upper and lower cross members are configured to be interchangeably coupled to an adjacent display panel support frame and a base assembly for supporting the display panel support frame on a ground surface.

21. The display panel support frame according to claim 1, wherein each of the plurality of the at least one internal vertical member has first and second ends, the first end coupled to the upper cross member and the second end coupled to the lower cross member.

22. The display panel support frame according to claim 1, wherein at least one of the at least one display mount is integrally formed in a corresponding one of the plurality of the at least one internal vertical member for directly attaching a display panel thereto.

23. A display assembly, comprising:
a plurality of display panels;
a plurality of frame modules removeably connected together to form a display assembly support structure, each of the display panels being coupled to a corresponding respective one of the plurality of frame modules;
wherein each of the plurality of frame modules includes:
an outer portion having upper and lower cross members and first and second vertical members extending therebetween; and
a plurality of internal vertical members located between the first and second vertical members and extending between the upper and lower cross members, each of the plurality of internal vertical members having a first end proximate the upper cross member and a second end proximate the lower cross member, at least some of the plurality of internal vertical members having at least one display mount for mounting a display panel thereto, wherein the plurality of internal vertical members are designed and configured to be structural support members and structurally support the upper cross member and support a vertical load from display panels and other ones of the plurality of frame modules located above a given frame module of the plurality of frame modules;
wherein the plurality of internal vertical members are designed and configured to support a greater proportion of the vertical load applied to the upper cross member from one or more of the plurality of frame modules located above a given frame module of the plurality of frame modules than the first and second vertical members.

24. The display assembly according to claim 23, wherein the plurality of display panels are positioned in a stacked self-supporting arrangement comprising a matrix of rows and columns, wherein the plurality of internal vertical members of the frame modules in a given column are configured to support a majority of a vertical load of the given column of display panels and corresponding respective frame modules to which the given column of display panels are attached.

25. The display assembly according to claim 23, wherein the display assembly is designed and configured to resist a lateral load acting on the display assembly, further wherein the display assembly support structure is designed and configured so that the plurality of display panels provide structural support for the display assembly and resist more of the lateral load than the display assembly support structure.

26. The display assembly according to claim 25, wherein the frame modules do not have any diagonal support members.

27. The display assembly according to claim 23, wherein the display assembly support structure has a centerline in a forward-aft direction, further wherein a center of gravity of each of the plurality of display panels is forward of the display assembly support structure centerline.

28. The display assembly according to claim 27, wherein the display assembly support structure has a front face, further wherein the center of gravity of each of the plurality of display panels is forward of the display assembly support structure front face.

29. The display assembly according to claim 27, further comprising at least one base assembly for supporting the plurality of display panels as a free-standing display assembly.

30. The display assembly according to claim 23, wherein each of the plurality of the at least one internal vertical member is positioned between the upper and lower cross members and provides a load path for transmitting a force from the upper cross member to the lower cross member.

31. The display assembly according to claim 23, further comprising a plurality of base assemblies for supporting the plurality of frame modules, wherein each of the plurality of base assemblies includes an attachment portion for attaching to and supporting a corresponding frame module, wherein a width of the attachment portion is substantially the same as a spacing between the plurality of internal vertical members.

32. A display panel support frame comprising:
an outer portion including:
  upper and lower cross members each having first and second ends;
  a first vertical member extending between the first ends of the upper and lower cross members; and
  a second vertical member extending between the second ends of the upper and lower cross members; and
at least one internal vertical member extending between the upper and lower cross members, the at least one internal vertical member having at least one display mount for attaching a display panel thereto;
wherein the display panel support frame is designed and configured to couple to adjacent display panel support frames to form a display assembly support structure for supporting a plurality of the display panels, the at least one internal vertical member being designed and configured to support a greater proportion of a vertical load applied to the upper cross member from one or more display panel support frames located above the display panel support frame when assembled as the display assembly support structure than the first and second vertical members.

33. The display panel support frame according to claim 32, wherein the at least one internal vertical member is designed and configured to be a structural support member that, when the display panel support frame is in use, structurally supports the upper cross member against the vertical load applied to a top surface of the upper cross member.

34. A display panel support frame comprising:
an outer portion including:
  upper and lower cross members each having first and second ends;
  a first vertical member extending between the first ends of the upper and lower cross members; and
  a second vertical member extending between the second ends of the upper and lower cross members; and
at least one internal vertical member extending between the upper and lower cross members, the at least one internal vertical member having at least one display mount for attaching a display panel thereto and the at least one internal vertical member having first and second ends that each include coupler recesses;
wherein the frame includes a plurality of couplers for attaching together adjacent frames to form a display assembly support structure, wherein ones of the plurality of couplers are disposed in corresponding ones of the coupler recesses.

35. The display panel support frame according to claim 34, wherein the at least one internal vertical member is designed and configured to be a structural support member that, when the frame is in use, structurally supports the upper cross member against a vertical load applied to a top surface of the upper cross member.

* * * * *